United States Patent [19]
Avramenko et al.

[11] Patent Number: 6,104,107
[45] Date of Patent: Aug. 15, 2000

[54] METHOD AND APPARATUS FOR SINGLE LINE ELECTRICAL TRANSMISSION

[75] Inventors: Stanislav Avramenko; Konstantin Avramenko, both of Moscow, Russian Federation

[73] Assignee: Uniline Limited, St. Holier, United Kingdom

[21] Appl. No.: 08/331,658

[22] PCT Filed: May 10, 1993

[86] PCT No.: PCT/GB93/00960

§ 371 Date: Jan. 11, 1995

§ 102(e) Date: Jan. 11, 1995

[87] PCT Pub. No.: WO93/23907

PCT Pub. Date: Nov. 25, 1993

[30]        Foreign Application Priority Data

May 8, 1992 [RU] Russian Federation ............... 5036137

[51] Int. Cl.[7] ...................................................... H02J 1/20
[52] U.S. Cl. ........................... 307/149; 331/67; 331/36 C
[58] Field of Search ........................ 307/149, 17; 333/99; 331/36 C, 67, 71, 86, 87, 88, 89, 90, 91, 187

[56]                References Cited

U.S. PATENT DOCUMENTS 454,622   6/1891   Tesla .
568,176   9/1896   Tesla .
593,138  11/1897   Tesla .

OTHER PUBLICATIONS

Grotz, "Wireless Transmission of Power, An Attempt To Verify Nikola Tesla's 1899 Colorado Springs Expriments, Results Of Research And Experimentation," Proceedings of the 26th IECEC Conference, vol. 4 (1991) pp. 404–409.

"Fachlexikon ABC Physik," VEB Edition Leipzig (1974) p. 1548.

G. Trinkaus, "Tesla—The Lost Inventions," Vantage Press (1988) pp. 13–14.

V.N. Dulin and M.S. Zhuk (editors), *Manual of Radio and Electronic Equipment Components* (Moscow 1977), pp. 69–70.

I. V. Alyamovsky, *Electron Beams and Electron Guns* (Moscow 1966), pp. 13–13–15, 59, and 108.

N. Tesla, "The True Wireless," *Electrical Experimenter* (May 1919).

Y. A. Khramov, "Physicists: A Biographical Reference Book" (Nauka 1983), pp. 8–9, 20–23, 26–27, 80–81, 84–85, 86–95, 102–103, 106–131, 136–139, 142–143, 178–179, 240–241.

M. Faraday, "Experimental Researches in Electricity" (Dover Publications, Inc. 1839), pp. 24–29.

"The Large Soviet Encyclopedia," vol. 26 (Moscow Publishing House 1977).

C. Gillispie, "Dictionary of Scientific Biography," vol. IV, pp. 532–535 (Charles Scribner's Sons 1971).

C. Gillispie, "Dictionary of Scientific Biography," vol. V, pp. 515–517 (Charles Scribner's Sons 1972).

C. Gillispie, "Dictionary of Scientific Biography," vol. IX, pp. 209–213 (Charles Scribner's Sons 1974).

G. Polvani, "Allessandro Volta" (Domus Galilæana 1942), pp. 340–353, 485.

M.I. Radovski, "Galvani and Volta," (1941), pp. 30–31, 58–59.

K.E. Swartz, "The Uncommon Physics of Common Phenomena," vol. 2 (1987), p. 148.

B.N. Rzhonsnitsky, "Nikola Tesla" (Molodaya Gvardiya 1959) pp. 6–7, 116–120.

G.K. Tsverava, "Nikola Tesla" (Nauka 1974) pp. 160–161, 176–177.

J.K. Maxwell, "Selected Works on Electromagnetic Field Theory" (Gosizdat 1952) pp. 252–255, 320–321.

J.J. O'Neill, "Prodical Genius, The life of Nikola Tesla" (Neville Spearman 1968) pp. 70–73, 128–133.

John O'Neill, "Electrical Prometheus" (History of Technology ("Molodaya Gvardiya") 1959).

*Primary Examiner*—William M. Shoop, Jr.
*Assistant Examiner*—Kim Lockett
*Attorney, Agent, or Firm*—Reid & Priest L.L.P.

[57]                ABSTRACT

This invention relates to the field of electrical technology, and relates particularly to a method for the continuous transformation of electrical energy with its subsequent transmission from an initial source (transformer) to a consuming device, and also to an apparatus for the implementation of this method of transformation and the supplying of power to electrical devices through a transmission line which does not form a closed circuit, ie consists of a single conducting wire. This invention therefore provides a method and associated apparatus for supplying power to an electrical device(s), including generation and subsequent transmission thereof to a receiving device via a transmission line, the method being characterised by the transformation of the electrical energy which is generated into the energy of oscillation of a field of free electrical charges such as the displacement current or longitudinal wave of an electrical field, the density of which charges varies in time, and the transmission of the energy via a transmission line which does not form a closed circuit comprising a single-wire transmission line and, where necessary, its transformation into the electromagnetic energy of conduction currents.

23 Claims, 3 Drawing Sheets

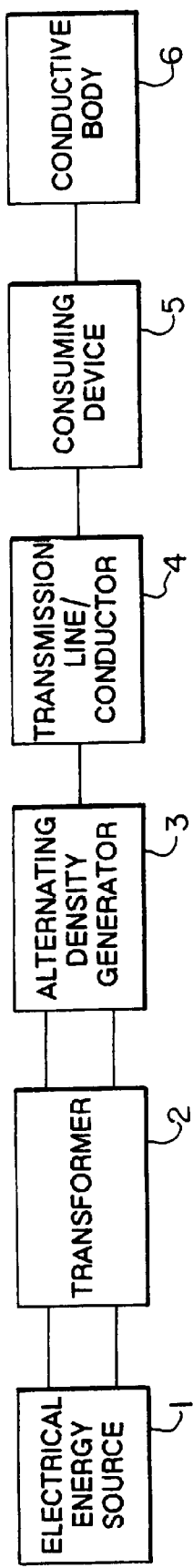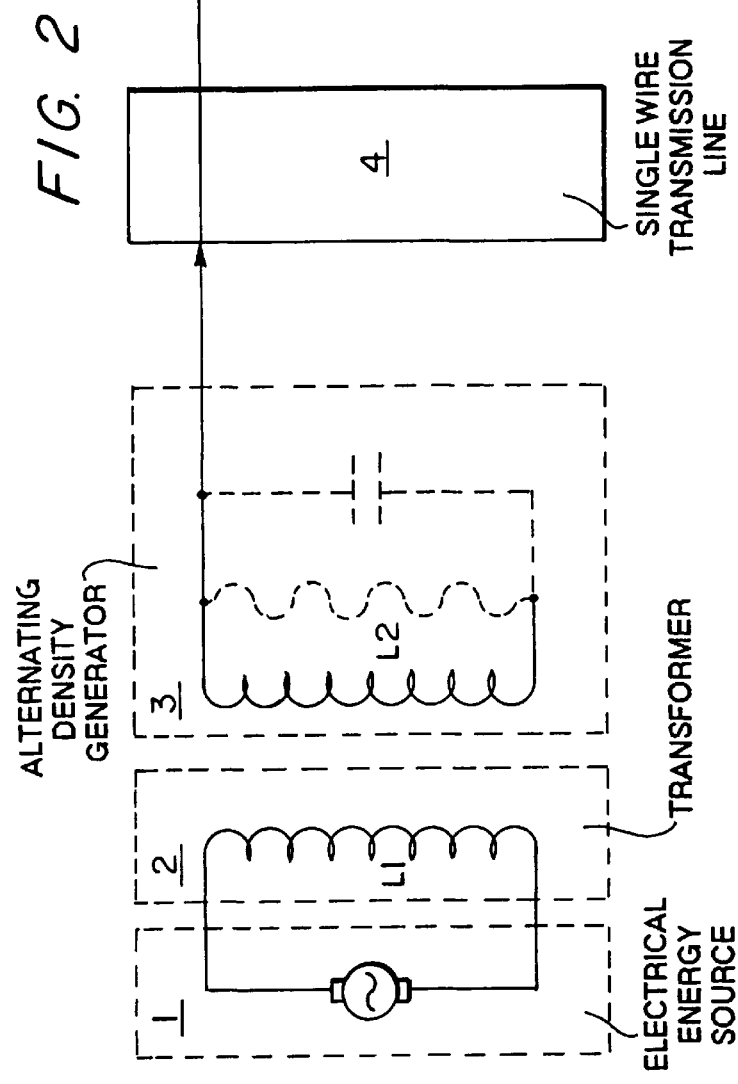

METHOD AND APPARATUS FOR SINGLE LINE ELECTRICAL TRANSMISSION

FIELD OF TECHNOLOGY

This invention relates to the field of electrical technology, and relates particularly to a method for the continuous transformation of electrical energy with fits subsequent transmission from an initial source (transformer) to a consuming device, and also to an apparatus for the implementation of this method of transformation and the supplying of power to electrical devices through a transmission line which does not form a closed circuit, ie consists of a single conducting wire.

BACKGROUND ART

There exists a means for the transmission of electrical energy along a conducting wire which does not form a closed circuit ie, a single conducting wire. It is based on the discovery in 1729 by the English physicist Stephen Grey of the phenomenon of electrical conductivity. The essence of this phenomenon consists in the fact that electricity may be transmitted from one body to another along a metal conductor or a length of yarn, and that the electrical charge is distributed over the surface of the conductor.

See Yu. A. Khramov, *Physicists: A Biographical Reference Book* (Moscow, "Nauka" 1983) (in Russian); and *Dictionary of scientific biography* (New York, Charles Scribener's Sons 1970–1978).

As to closed circuits, a well known means for the supplying of power to electrical devices has existed since the creation in 1799 by the Italian scientist Alessandro Volta of the first source of prolonged electrical current (Volta's column). This means is based on the transmission of electrical energy generated in the initial source to the consuming device directly through a transmission line consisting of two conducting wires which together with the source and the load form a closed circuit.

See Yu. A. Khramov, *Physicists: A Biographical Reference Book*, M. I. Radovsky, *Galvani and Volta* (Moscow-Leningrad 1941) (in Russian); and G. Polvani, *Alessandro Volta* (Pisa 1942).

There exists another important type of closed circuit that represents a means for the supply of power to electrical devices based on the discovery made by M Faraday and J Henry of the phenomenon of electromagnetic induction (published by M Faraday in 1831, and on the invention by P N Yablochkov in 1876 of the electrical transformer. The essence of this means consists in the transformation of the current or the voltage of electrical energy generated in the initial source and the transmission line to the consuming device.

See M. Faraday, *Experimental Research in Electricity* (Moscow-Leningrad, Publishing House of the Academy of Sciences of the USSR 1947–1959) (in Russian); Yu. A. Khramov, *Physicists: A Biographical Reference Book; The Large Soviet Encyclopedia,* 3rd Ed. (Bol 26 Moscow, "Soviet Encyclopedia" 1977) (in Russian).

As to wireless means, there exists a means for the supplying of power to electrical and radio devices by using an electromagnetic field. This means is based an G Herz's experimental proof in 1888 of the existence of electromagnetic waves, the discovery of which was forecast by J Maxwell in 1865. The means essentially consists in the transformation of electrical energy from the initial source into an electromagnetic field which is radiated into space and received by the consuming device.

Dictionary of Scientific Biography. New York, Charles Scribener's Sons, 1970–1978. Yu A Khramov, Physicists: A Biographical Reference Book. Moscow, "Nauka", 1983 (in Russian); J K Maxwell, Selected Works on Electromagnetic Field Theory, Moscow "Gosizdat", 1954 (in Russian).

There also exists an electrical device for the transmission of the energy of free electrical charges from the initial source by means of a non-conducting ribbon. This is the so-called high voltage electrostatic generator, which was designed and constructed by the American physicist Van de Graaf between 1929 and 1933. In this device electrical charges are sprayed from needles under high voltage on to a moving ribbon and transferred to an insulated metal dome, where they accumulate. The charges may be sprayed on to the ribbon and collected from it; the ribbon and the dome may be negatively or positively charged.

See K. E. Swarts, *The Uncommon Physics of Common Phenomena,* Vol. 2, translated from the English by E. I. Butikov and A. S. Kondratiev (Moscow 1987) (in Russian); *Biography;* and Yu. A. Khramov, *Physicists: A Biographical Reference Book.*

It is believed to have been proposed to provide a means for the supply of power to electrical devices via a single-wire transmission line, demonstrated by N Tesla in the late nineteenth century.

See John O'Neill, *Electrical Prometheus,* (Moscow "History of Technology" 1944) (in Russian); B. N. Rzhonsnitsky, *Nikola Tesla* (Moscow "Molodaya Gvardiya" 1959) (in Russian); and G. K. Tsverava, *Nikola Tesla* (Leningrad "Nauka" 1974) (in Russian).

It is believed there is a trace mentioned by John O'Neill of one more distinctive means for electrical transmission but description of this trade did not have details and was not confirmed by any original document.

OBJECTS OF THE INVENTION

An object of the present invention is to provide an increase of the coefficient of efficiency to transmission from an initial source to a consuming device in electrical technology, and also a simultaneous reduction in the metal content of the transmission line.

SUMMARY OF THE INVENTION

According to a first aspect of the present invention there is provided a method of supplying power to one or more electrical devices, including generation and transformation of electrical energy and subsequent transmission thereof to a receiving device via a transmission line, the method being chracterised by the transformation of the electrical energy which is generated into the energy of oscillation of a field of free electrical charges such as a displacement current or longitudinal wave of an electrical field, the density of which charges varies in time, and the transmission of the energy via a transmission line which does not form a closed circuit comprising a single-wire transmission line and, where necessary, its transformation into the electromagnetic energy of conduction currents.

Thus, the invention provides transformation of electrical energy generated in an initial source into energy of oscillation of a field of free electrical charges (the displacement current or longitudinal wave of the electrical field), which energy is transmitted to the consuming device via a conductor of the transmission line which does not form a closed circuit and, where necessary, transformed into the electromagnetic energy of closed circuit conductive currents.

The oscillations of the field of free electrical particles occur either by means of the reciprocating (cyclical) displacement of a concentrated electrical charge in space, or by means of a periodical change in density (and/or polarity) of the free electrical charges on a particular surface (in a particular volume).

According to a second aspect of the present invention there is provided an apparatus for the implementation of the above method of supplying power to one or more electrical devices, the apparatus providing an initial source of electrical energy, a transforming device, a transmission line and a receiving device, the apparatus being characterised by the provision of a variable density generator of free electrical charges as the displacement current or longitudinal wave of an electrical field, an output of which is connected by means of: a conductor of a transmission line which does not form a closed circuit to a receiving device, either directly or via a blocking capacitor, and further to any conductive body possessing an equivalent (natural) capacity adequate to ensure the normal functioning of the receiving device.

Thus, the invention provides a variable (alternating) density generator of free electrical charges, which flow under the influence of coulomb forces along a conductor of the transmission line which does not form a closed circuit to the site of a device which consumes electrical energy.

A possible variant of the generator is a generator at the outlet of which not only the density of the free electrical charges, but also their polarity, may be varied.

The outlet of the generator is connected to a conductor of the transmission line which does not form a closed circuit line either directly or via a blocking capacitor.

In addition, the generator of oscillations of the electrical field of free charges may be constructed in a similar fashion to a generator of displacement current (travelling longitudinal waves of an electrical field), by using a sequential resonance circuit in the form of two interconnected inductors such that the equivalent inductivity of the resonance circuit is provided by their resultant inductivity, and the equivalent capacity of the resonance circuit is provided by the equivalent (natural) capacity of the interconnected inductors.

To supply power to electrical devices which consume alternating current, the output of the conductor of the transmission line which does not form a closed circuit may be connected:

a) to one of the input terminals of the receiving devices, while the device's other input terminal is either grounded or connected to any conductor possessing a natural (equivalent) capacity adequate to provide for the normal working of the receiving (consuming) device.

b) to an accommodating device employing a conversion circuit consisting of two interconnected inductors, such that the receiving device (load) is connected to the two ends of the first inductor, the output of the conductor of the transmission line which does not form a closed circuit is connected to one end of the second inductor, and the other end of the second inductor connected to any conductor with an equivalent (natural) capacity and inductance selected in order to provide for the nominal power consumption of the receiving device (load).

To supply power to devices consuming direct current, the conductor of the transmission line which does not form a closed circuit may be connected to an adjustment circuit in the form of:

c) a diode system, such that the output of the conductor of the transmission line which does not fort a closed circuit is connected to the common point of the anode of the first diode and the cathode of the second diode, while the cathode of the first diode and the anode of the second diode are the output points for connection to the receiving device, either directly or with a capacitor connected in parallel.

d) a transformer circuit consisting of two interconnected inductors such as to rectify alternating current (voltage) directed to the receiving device from the first inductor.

BRIEF DESCRIPTION OF THE DRAWINGS

In order to provide a better understanding of the invention, there follow specific examples of its construction with references to the drawings attached, in which:

FIG. 1 shows a block diagram of a first embodiment of an apparatus according to the present invention;

FIG. 2 shows a schematic diagram of a second embodiment of an apparatus according to the present invention, employing a sequential resonance circuit;

DESCRIPTION OF FIRST EMBODIMENT

Figure 3:
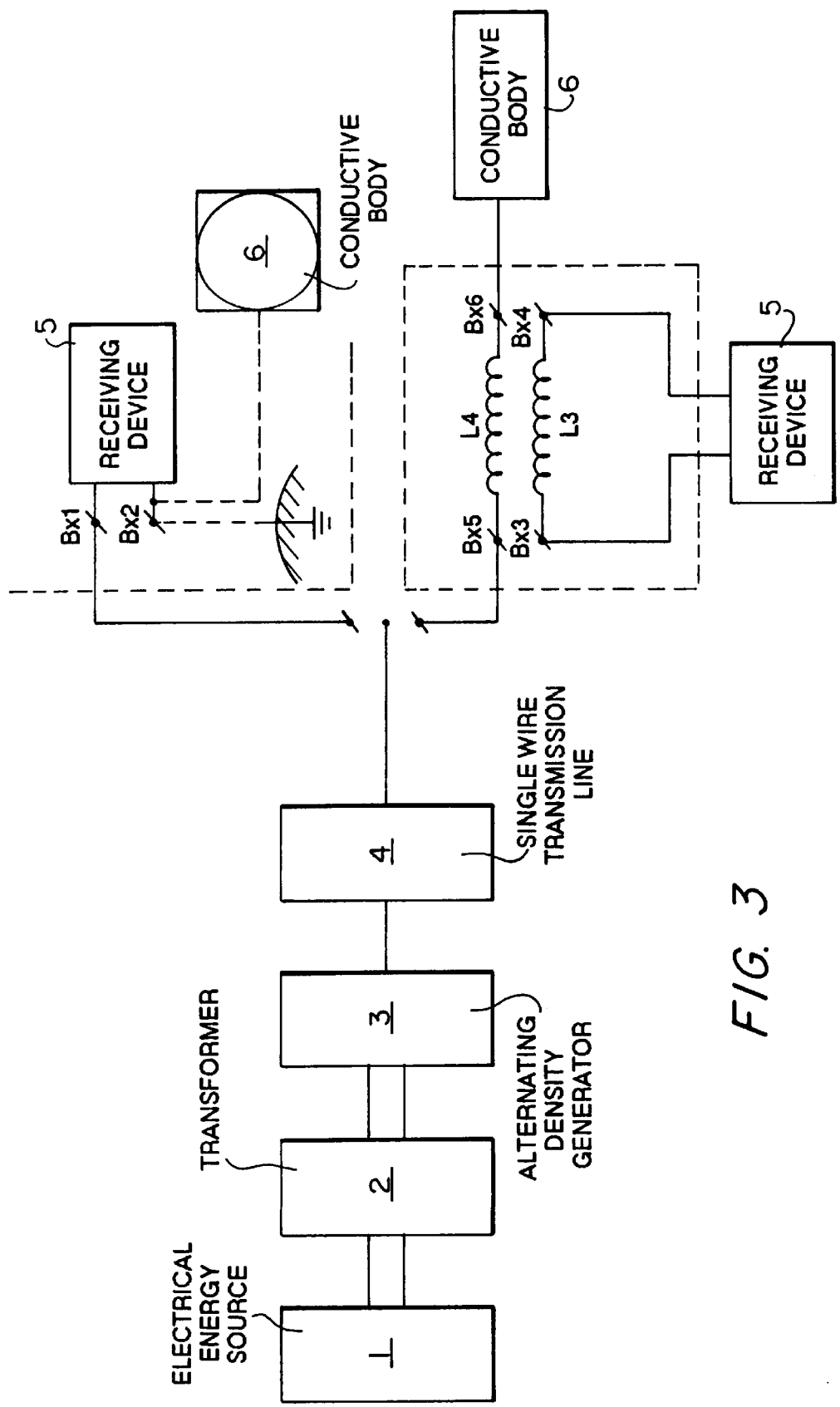
FIG. 3 shows a power supply diagram for receiving devices operating on alternating current.

The first embodiment of the invention provides apparatus adapted for use in a method of supplying power to electrical devices, including the generation and transformation of electrical energy with its subsequent transmission to a receiving device via a transmission line, the method being distinguished by the fact that the electrical energy generated is transformed into the energy of oscillation of a field of free electrical charges (the displacement current or longitudinal wave of an electrical field), the density of which charges varies in time, and this energy is transmitted via a conductor of the transmission line which does not form a closed circuit and, where necessary, transformed into the electromagnetic energy of conductive currents.

Referring to FIG. 1, there is illustrated an apparatus for initial source of electrical energy 1, a transformer (of current, voltage or frequency) 2, an alternating density generator of free electrical charges 3, which charges flow under the influence of coulomb forces along a transmission line or conductor 4, through a consuming device 5, to any conductive body 6, which has an equivalent (natural) capacity sufficient to provide for the normal working of the consuming device 5.

DESCRIPTION OF SECOND EMBODIMENT

Referring to FIG. 2, in addition, the apparatus may be constructed on the basis of a generator of displacement current (longitudinal wave of an electrical field), using a sequential resonance circuit (FIG. 2) in the form of two interconnected inductors L1 and L2 such that an equivalent inductivity Leg of the resonance circuit is provided, in the simplest case of idle running, by the resultant inductivity L1 and L2, and the equivalent capacity is provided by the resultant (natural) capacity of the resonance circuit.

To supply power to electrical devices operating on alternating (variable) current, the output of the conductor of the transmission line which does not form a closed circuit 4 is connected either:

to one of the input terminals Bx1 of the receiving device 5 (FIG. 3), and the other input terminal Bx3 of the receiving device is either earthed or connected to any conductive body 6 possessing an equivalent (natural) capacity adequate to ensure the normal working of the receiving device 5; or to an accommodating device, employing a transformer circuit (FIG. 3) consisting of two interconnected inductors L3 and L4, such that the two ends Bx3 and Bx4 of the inductor L3 are connected to the receiving device 5, while one end of the ends Bx5 of the second inductor L4 is connected to the output of the conductor of the transmission line which does not form a closed circuit 4, and the other end Bx6 of the inductor L4 is connected to any conductive body 6, with an equivalent (natural) capacity selected in order to provide the nominal power consumption of the receiving device 5.

Figure 4:
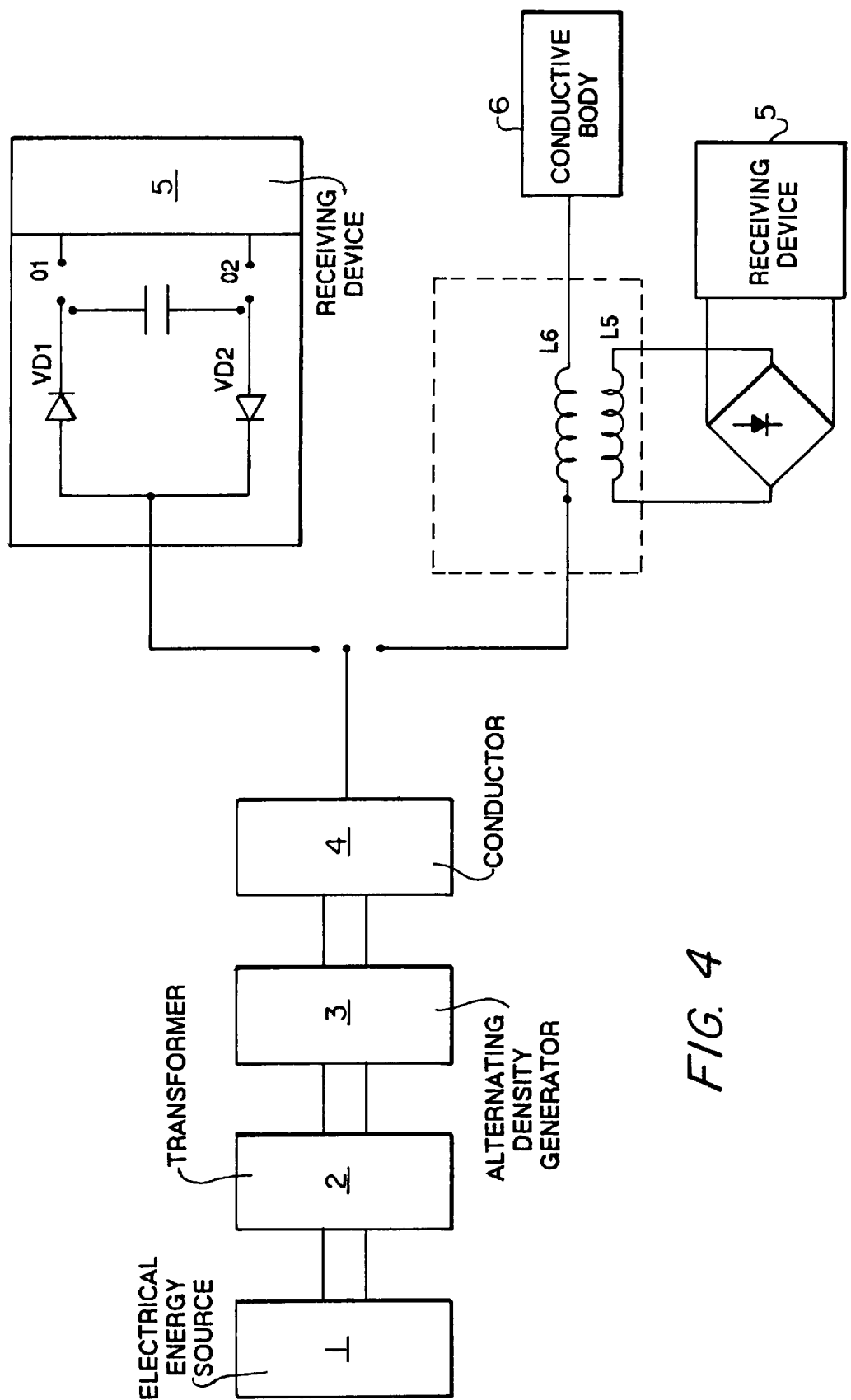
FIG. 4 shows a power supply diagram for receiving devices operating on direct current.

To supply power to electrical devices operating on direct current, the output of the conductor of the transmission line which does not form a closed circuit 4 is connected to an accommodation circuit in the form of either:

a diode circuit (FIG. 4) such that output or the conductor 4 is connected to the common point of the anode of the first diode VD1 and the cathode of the second diode VD2, while the cathode of the first diode VD1 and the anode of the second diode VD2 are the outlets 01 and 02 to be connected to the receiving device 5, either directly or with a capacitor connected in parallel;

a transformer circuit (FIG. 4) employing two interconnected inductors L5, L6, such that the receiving device 5 is connected to the inductor L5 via the rectifying circuit.

The method for supply of power to electrical devices and the apparatus for the implementation of this method, according to the invention, possess a high degree of reliability due to the absence of complex electronic or mechanical assemblies. They permit the use of inexpensive mass-produced radio-electronic components and their working cycle is automatically regulated to a high degree.

Use of the invention will make possible a sharp reduction in the costs involved in transmitting electrical energy over long distances, and a sharp reduction in the losses of Joulean heat from transmission lines.

The invention is intended for the creation of a highly efficient means for the transformation and transmission of electrical energy, and also for the creation of both permanent and mobile devices for the transmission of electrical energy from an initial source to a consuming device via a transmission line which does not form a closed circuit, ie a single-wire transmission line.

The invention may be used conjointly with various power-engineering and technological processes which involve the use of super-high voltage electrical and electromagnetic fields, electron beams and super-long wave radio communications, when it will make possible a sharp reduction in the dimensions and weight of equipment as compared with the means traditionally employed.

The proposed apparatus, which may be termed a "monovibrator", may consist of two inductively connected much layered coils in accordance with the scheme of a consecutive resonance circuit. As a rule, the secondary coil consists of up to some tens of thousands of turns of thin isolated wire with the turns wound one to another in many layers on a dialectic core. Disposition of the primary coil in respect to the secondary one doesn't matter much. What does matter is an inductive link which determines potential transmitted from the primary to the secondary coil. The monovibrator may or may not have a ferromagnetic core. The ferromagnetic core influences the width of the working frequency bandwidth—it broadens it.

High working outcoming voltage is the result of a high coefficient of transformation, as the primary coil usually contains a couple of dozens of winds for working frequencies ranging from 1 kHz to a couple of hundred kHz. A preferred working frequency is 5 kHz.

With a sequential resonance circuit including two interconnected inductors having inductance L1 and L2, and an equivalent inductance of the resonance circuit being provided by the resultant inductivity L1+L2, the load of the monovibrator when running idle acquires capacitance character that means which it is reactive. The magnitude of an active constituent of a monoconductive line with the consecutive resonance is rather low and its incoming resistance is approaching zero. That is why with rather a powerful primary source the consecutive resonance makes it possible to transmit more power through the monoconductive line in case there is an outtake of this power at the other line terminal, which is opposite to the primary source of power.

Reaction of the monoconductive line of any length can always be compensated by regulating the frequency of the primary source (generator, converting devices), thus providing consecutive resonance in the line itself with all the magnitudes of incoming and outgoing characteristics arising therefrom.

Currently there are different schemes of automatic frequency regulation of generators of alternating electromotive power depending on changing inductive-capacitant parameters of conductive lines.

The method and apparatus of the present invention does not have the drawbacks of previously known single line systems.

What is claimed is:

1. A method of supplying power to at least one receiving electrical device, comprising the steps of:
   (a) generating electrical energy;
   (b) transforming the electrical energy generated in said step (a) into the oscillation energy of a field of free electrical charges, the density of which varies in time;
   (c) transmitting the electrical energy transformed in said step (b) to a receiving electrical device via a single-wire transmission line.

2. The method of claim 1, wherein in said step (b), the oscillation energy of a field of free electrical charges comprises a displacement current of an electrical field.

3. The method of claim 2, further comprising the step of:
   (d) following said step (b) and prior to said step (c), transforming the displacement current into a conduction current for use by an electrical device powered by conduction current.

4. Apparatus for supplying power to at least one electrical device, comprising:
   an initial source of electrical energy,
   a transformer operatively connected to said initial source to receive electrical energy therefrom; an alternating density generator for transforming the electrical energy from said transformer into an aggregate of free electrical charges, the density of which varies in time;
   a single-wire transmission line, said transmission line including a conductor connecting the output of said alternating density generator to a receiving device; and
   a conductive body electrically connected to the receiving device, said conductive body having a charge storage capacity of a magnitude adequate to ensure normal functioning of the receiving device.

5. The apparatus of claim 4, further comprising a blocking capacitor interposed between said transmission line and the receiving device.

6. The apparatus of claim 4, wherein said alternating density generator comprises a sequential resonance circuit including two interconnected inductors having inductance L1 and L2, and an equivalent inductance of said resonance circuit being provided by the resultant inductivity L1+L2.

7. The apparatus of claim 4, wherein said alternating density generator transforms the electrical energy from said generator into a displacement current.

8. The apparatus of claim 4, wherein said alternating density generator transforms the electrical energy from said generator into a longitudinal wave of an electrical field.

9. The apparatus of claim 6, wherein the electrical device operates on alternating current, and wherein said apparatus further comprises an accommodating device connected to said conductor of said transmission line, said accommodating device including a transformer circuit including at least first and second interconnected inductors, each of said inductors having first and second ends, said first and second ends of said first inductor being connected to the receiving device, said first end of said second inductor connecting said accommodating device to the output of said conductor of said transmission line, and said second end of said second inductor being connected to said conductive body.

10. The apparatus of claim 6, wherein the electrical device operates on direct current, said apparatus further comprising first and second accommodating devices selectively connectable to said conductor of said transmission line, wherein:

said first accommodating device comprises a diode circuit including first and second diodes, said first diode having an anode and said second diode having a cathode which are commonly connected to the output of said conductor of said transmission line, said first diode having a cathode and said second diode having an anode defining outlets connected to the receiving device; and said second accommodating device comprises a transformer circuit including first and second interconnected inductors and a rectifying circuit connecting one of said first and second inductors to the receiving device.

11. The apparatus of claim 6, wherein said first and second interconnected inductors comprise first and second inductively connected coils arranged in accordance with the scheme of a consecutive resonance contour, said second coil comprising a plurality of turns of isolated wire wound around a dielectric body.

12. The apparatus of claim 10, wherein said diode circuit of said first accommodating device further includes a capacitor connected in parallel with said cathode of said first diode and said anode of said second diode.

13. The apparatus of claim 11, wherein said first and second inductors have a ferromagnetic core.

14. Apparatus for supplying power to at least one electrical device, comprising:

an initial source of electrical energy;

an alternating density generator for transforming the electrical energy from said source into the oscillation energy of a field of free electrical charges, the density of which varies with time;

a single-wire transmission line, said transmission line including a conductor connecting the output of said alternating density generator to a receiving device; and a conductive body electrically connected to the receiving device, said conductive body having a charge storage capacity of a magnitude adequate to ensure normal functioning of the receiving device.

15. The apparatus of claim 14, further comprising a blocking capacitor interposed between said transmission line and the receiving device.

16. The apparatus of claim 14, wherein said alternating density generator comprises a sequential resonance circuit including two interconnected inductors having inductance L1 and L2, and an equivalent inductance of said resonance circuit being provided by the resultant inductivity L1+L2.

17. The apparatus of claim 16, wherein said alternating density generator transforms the electrical energy from said generator into a displacement current.

18. The apparatus of claim 16, wherein said alternating density generator transforms the electrical energy from said generator into a longitudinal wave of an electrical field.

19. The apparatus of claim 16, wherein the electrical device operates on alternating current, and wherein said apparatus further comprises an accommodating device connected to said conductor of said transmission line, said accommodating device including a transformer circuit including at least first and second interconnected inductors, each of said inductors having first and second ends, said first and second ends of said first inductor being connected to the receiving device, said first end of said second inductor connecting said accommodating device to the output of said conductor of said transmission line, and said second end of said second inductor being connected to said conductive body.

20. The apparatus of claim 16, wherein the electrical device operates on direct current, said apparatus further comprising first and second accommodating devices selectively connectable to said conductor of said transmission line, wherein:

said first accommodating device comprises a diode circuit including first and second diodes, said first diode having an anode and said second diode having a cathode which are commonly connected to the output of said conductor of said transmission line, said first diode having a cathode and said second diode having an anode defining outlets connected to the receiving device; and said second accommodating device comprises a transformer circuit including first and second interconnected inductors and a rectifying circuit connecting one of said first and second inductors to the receiving device.

21. The apparatus of claim 20, wherein said diode circuit of said first accommodating device further includes a capacitor connected in parallel with said cathode of said first diode and said anode of said second diode.

22. The apparatus of claim 16, wherein said first and second interconnected inductors comprise first and second inductively connected coils arranged in accordance with the scheme of a consecutive resonance contour, said second coil comprising a plurality of turns of isolated wire wound around a dielectric body.

23. The apparatus of claim 22, wherein said first and second inductors have a ferromagnetic core.

* * * * *